US011832108B2

(12) United States Patent
Fiorillo et al.

(10) Patent No.: US 11,832,108 B2
(45) Date of Patent: Nov. 28, 2023

(54) LAWFUL INTERCEPTION IN MOBILE CONNECT

(71) Applicant: Telefonaktiebolaget LM Ericsson (publ), Stockholm (SE)

(72) Inventors: Lorenzo Fiorillo, San Nicola la Strada (IT); Onofrio Gallo, Caserta (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 17/442,652

(22) PCT Filed: Mar. 25, 2019

(86) PCT No.: PCT/SE2019/050265
§ 371 (c)(1),
(2) Date: Sep. 24, 2021

(87) PCT Pub. No.: WO2020/197450
PCT Pub. Date: Oct. 1, 2020

(65) Prior Publication Data
US 2022/0182841 A1   Jun. 9, 2022

(51) Int. Cl.
*H04W 12/80* (2021.01)
(52) U.S. Cl.
CPC .................. *H04W 12/80* (2021.01)
(58) Field of Classification Search
CPC ....... H04W 12/06; H04W 12/80; G06F 21/30; G06F 21/44; G06F 21/60; G06F 21/71
See application file for complete search history.

(56) References Cited

U.S. PATENT DOCUMENTS

| | | | | |
|---|---|---|---|---|
| 8,438,627 | B1 * | 5/2013 | Hirschman | H04W 8/087 709/227 |
| 8,462,710 | B2 * | 6/2013 | Walker | H04W 12/06 455/411 |

(Continued)

FOREIGN PATENT DOCUMENTS

| | | |
|---|---|---|
| CN | 102308550 A | 1/2012 |
| CN | 107295515 A | 10/2017 |

(Continued)

OTHER PUBLICATIONS

International Search Report and Written Opinion issued in International Application No. PCT/SE2019/050265 dated Dec. 16, 2019 (8 pages).

*Primary Examiner* — Hosuk Song
(74) *Attorney, Agent, or Firm* — Rothwell, Figg, Ernst & Manbeck, P.C.

(57) ABSTRACT

A lawful interception, LI, intercept access point, IAP, function (135) in a mobile connect, MC, identity gateway, ID GW, function (107) receives, from a LI administrative function, ADMF (108), a request for activation of LI for a target identity, A, during a specified LI time interval. A detection is made, during the LI time interval, that the ID GW function (107) has at least started an authentication and authorization procedure for a service that the target identity, A, has requested and as a consequence of the detection obtaining, from the ID GW function (107), personal data pertaining to the target identity, A, and providing the obtained personal data pertaining to the target identity, A, to a LI mediation and delivery 10 function MF/DF (132), for example via an X2 interface.

9 Claims, 5 Drawing Sheets

(56) References Cited

U.S. PATENT DOCUMENTS

| | | | | |
|---|---|---|---|---|
| 8,706,089 B2* | 4/2014 | Di Donato | ............ | H04W 12/02 |
| | | | | 455/418 |
| 10,237,197 B2* | 3/2019 | Chaudhuri | .............. | H04L 47/32 |
| 10,523,482 B2* | 12/2019 | Chaudhuri | .......... | H04L 27/2602 |
| 10,524,145 B1* | 12/2019 | Das | .................... | H04L 41/5019 |
| 10,756,804 B2* | 8/2020 | Stojanovski | ........... | H04B 7/155 |
| 10,812,629 B2* | 10/2020 | Park | ........................ | H04L 69/22 |
| 2013/0057388 A1 | 3/2013 | Attanasio | | |
| 2013/0282878 A1 | 10/2013 | Attanasio | | |
| 2018/0241782 A1 | 8/2018 | Senatore et al. | | |
| 2019/0019363 A1 | 1/2019 | Zellner | | |

FOREIGN PATENT DOCUMENTS

| | | |
|---|---|---|
| CN | 107852401 4 | 3/2018 |
| WO | 2008/150203 A1 | 12/2008 |
| WO | 2014/169470 A1 | 10/2014 |

\* cited by examiner

LAWFUL INTERCEPTION IN MOBILE CONNECT

CROSS REFERENCE TO RELATED APPLICATION

This application is a 35 U.S.C. § 371 National Stage of International Patent Application No. PCT/SE2019/050265, filed Mar. 25, 2019.

TECHNICAL FIELD

Embodiments herein relate to methods of handling lawful interception (LI) in a mobile connect (MC) context in a communication system, a corresponding computer system as well as computer programs and carriers of such computer programs.

BACKGROUND

Mobile Connect (MC) is a technology for secure universal log-in specified by the Global System for Mobile Communications Association (GSMA). Simply by matching a user to the user's mobile phone, Mobile Connect functionality allow user subscribers to log-in to service provider's websites and applications quickly without the need to remember passwords and usernames. MC functions provide safe and secure log in and no personal information is shared without permission from the user.

More specifically, MC functionality is used for authenticating a user subscriber before a service provider, sharing attributes (e.g., the user's own address, date of birth, etc.) from a mobile network operator (MNO), with which the user is associated as a subscriber, to a service provider, consent management, etc. The MC functionality has access to personal data of the subscriber; however, the MC functionality does not involve actual communication from one user to another, which means that a service provider will be supplied only with the data which are explicitly authorized by the subscriber.

Mobile Connect functionality may be used to grant users access to internet services using pseudo-anonymous customer references (PCR), wherein the correlation between the PCR and the real user identity is known only to the Mobile Connect functionality. This means that such information may be extremely useful to law enforcement agencies (LEA) in case the user is a target of lawful interception (LI).

However, LI is based on the technical target identities as requested by the LEA. Very often such identities are coming from previous investigations and there is no additional information available to the LEA. In other words, besides a technical target identity such as a Mobile Station International Subscriber Directory Number (MSISDN) or an International Mobile Equipment Identity (IMEI) or a Session Initiation Protocol Uniform Resource Identifier (SIP-URI), the LEA is not aware of the personal data belonging to the user, i.e. person, who is associated to that technical identity. Typically, such data are not immediately available and will require manual investigation in proprietary and different data bases.

SUMMARY

In view of the above, an object of the present disclosure is to overcome drawbacks related to lawful interception in a communication system. This object is achieved in a first aspect by a method performed by a LI intercept access point (IAP) function in an MC identity gateway (ID GW) function.

The method of the first aspect comprises receiving, from a LI administrative function, (ADMF) a request for activation of LI for a target identity during a specified LI time interval. A detection is made, during the LI time interval, that the ID GW function has at least started an authentication and authorization (AA) procedure for a service that the target identity has requested and as a consequence of the detection obtaining, from the ID GW function, personal data pertaining to the target identity, and providing the obtained personal data pertaining to the target identity to a LI mediation and delivery function (MF/DF), for example via an X2 interface.

That is, such a method provides an improved capability to a LEA when performing LI of a target identity who is utilizing MC functionality in a communication network. Such an improved capability means that a LEA is provided with personal data of a LI target identity that may enable further detailed investigation and thereby improve the likelihood of identifying a target identity with an actual person.

The detecting that the ID GW function has at least started an AA procedure may comprise detecting that the ID GW function has determined that the target identity is authorized in relation to the service.

In some embodiments, the target identity may be any of an MSISDN, an IMEI and a SIP-URI, and in such embodiments, the personal data pertaining to the target identity may comprise PCR pertaining to the target identity's association with the requested service.

In some embodiments, the reception, from the LI ADMF, of the request for activation of LI comprises reception of an identifier of the requested service. In such embodiments, the target identity may comprise a PCR pertaining to the target identity's association with the requested service, and the personal data pertaining to the target identity may in these embodiments comprise any of an MSISDN, an IMEI and a SIP-URI.

The personal data pertaining to the target identity may in various embodiments comprise any of a timestamp that specifies a point in time when a PCR was created, a PCR associated with a second service different than the service, a date of birth, an address etc.

In some embodiments, the obtained personal data pertaining to the target identity is provided to a data retention (DR) server.

In a further aspect there is provided a computer system comprising a plurality of server blades, each server blade comprising a processor and a memory. The memory contains instructions executable by the processor whereby the computer system is operative to perform a method as summarized above in connection with the first aspect.

In yet a further aspect there are provided a computer program comprising instructions which, when executed on at least one processor cause a processor to carry out a method according to the first aspect. In yet a further aspect there is provided a carrier comprising such a computer program, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
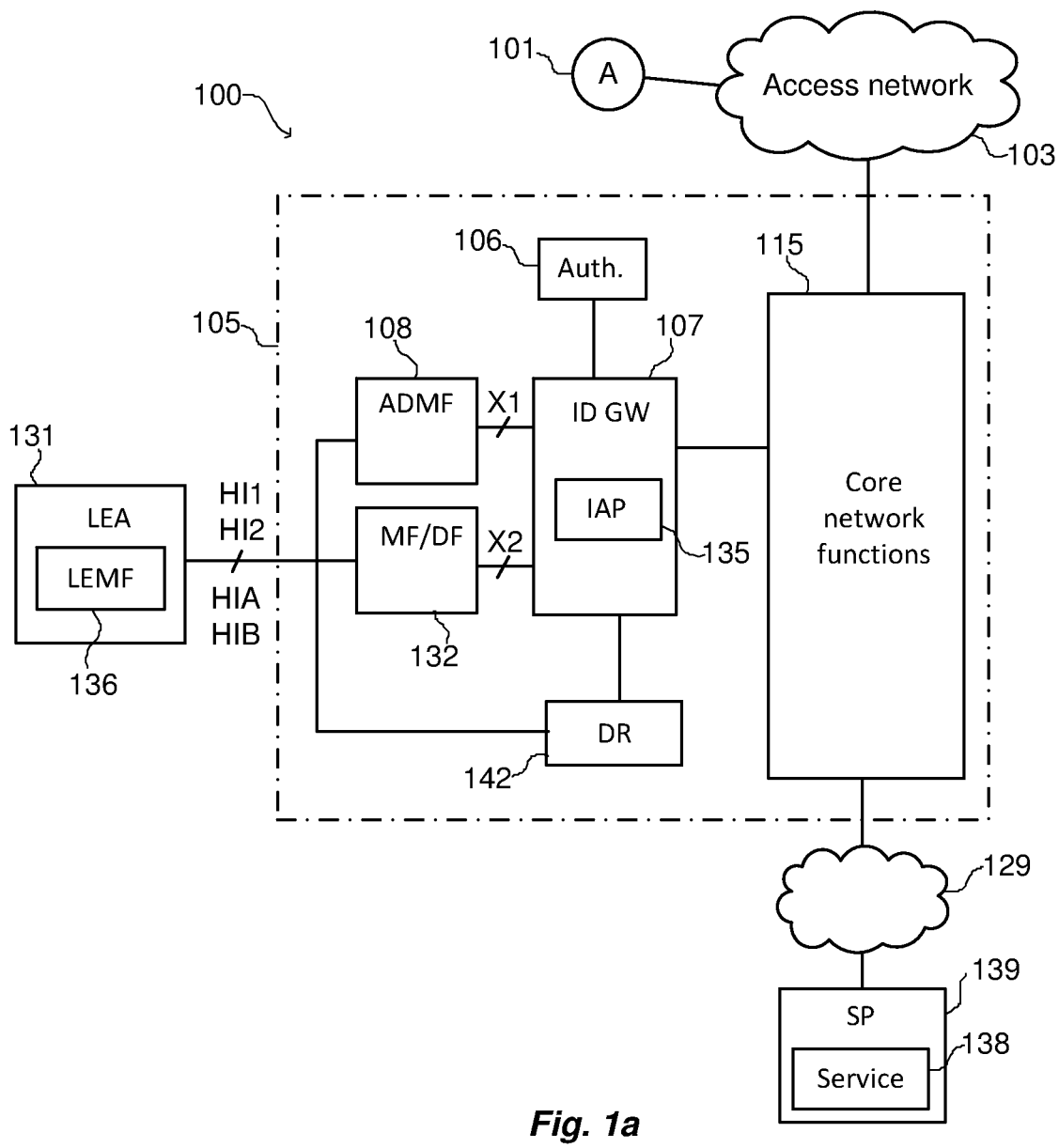
FIGS. 1a and 1b are schematically illustrated block diagrams of communication systems.

FIG. 1a schematically illustrates a first functional representation of a communication system 100 comprising a core network 105 and an access network 103 in which a communicating entity 101 is connected. The access network may, e.g., be in the form of a third generation partnership project (3GPP) radio access network (RAN) or any other type of non-3GPP communication network that may connect to the core network 105.

As the skilled person will realize, communication performed by the entity 101 is enabled by several functional units in both the access network 103 and the core network 105. For the sake of clarity of description, such functional units are not illustrated in full but only schematically represented and exemplified by a collection of core network functions 115 that, in a 4G context, may comprise a mobility management entity (MME), a serving gateway (S-GW), a packet data network gateway (P-GW) etc. In a 5G context, the core network functions 115 may further comprise, e.g., a policy control function (PCF), a user data management function (UDM) and a session management function (SMF). For the purpose of the present disclosure, the core network functions 115 may be considered as a collection of functions that enable the entity 101 to connect to and communicate with a service 138 that is hosted or provided by a computer system operated by a service provider 139 and connected to the core network 105 via an access network 129 that may be an internet protocol (IP) network.

The communication system 100 is configured such that it provides MC functionality and, as such, the communication system 100 further comprises an identity gateway (ID GW) function 107 (herein also denoted by ID GW) as well as an authentication function 106. As the skilled person will realize, MC is a solution for offering service providers, e.g. the SP 139, a reliable authentication mechanism for communicating entities such as the entity 101 when communicating in the communication system 100. The MC solution is more reliable than traditional self-asserted identity handling using, typically, only a username/password mechanism. The MC functionality provides stronger identity management mechanisms leveraged on the possession on a mobile device for authentication alongside with communication system operator's trust in identity proofing.

The MC functionality allows the communicating entity 101 who is accessing the service 138 from the service provider 139 to be authenticated by the ID GW 107, e.g. by means of an MSIDN of the device with which the entity 101 communicates. The authentication process allows the communicating entity 101 to access the requested service 138 without using specific user-identities or passwords. In some cases, the service provider 139 may require the authentication procedure to be done by including a so-called personally identifiable information (PPI) user check; in such cases the access is made to the authentication function 106 for retrieving such data and proceed with the authentication process.

The communication system 100 is further configured to provide LI services to a LEA 131. Consequently, the core network 105 also comprises a LI ADMF 108 and a LI MF/DF function 132 that connects to a LEA 131. The ADMF 108 is configured to handle LI ADMF operations such as receiving warrants for intercepting information in the form of intercept related information (IRI) and call content (CC) associated with a target. For the purpose of the present disclosure, the communicating entity 101 is such a target, denoted with a target identity A, that is a subject of LI when communicating with the service 138 provided by the service provider 139. The MF/DF function 132 is configured to handle IRI and CC received from an intercept access point (IAP) 135 in the ID GW 107 and provide the IRI and CC to the LEA 131. The ADMF 108 and the MF/DF 132 communicates with the IAP 135 via X1 and X2 interfaces. The LEA 131 manages a law enforcement management facility (LEMF) 136, which communicates with the ADMF 108 and receives IRI and CC from the MF/DF 132 via a HI1 and a HI2 interface, respectively.

The core network 105 also comprises a data retention server 142 that is configured to communicate with the LEA 131 via HIA and HIB interfaces, and configured to communicate with the ID GW 107 as will be exemplified in further detail below.

Figure 1B:
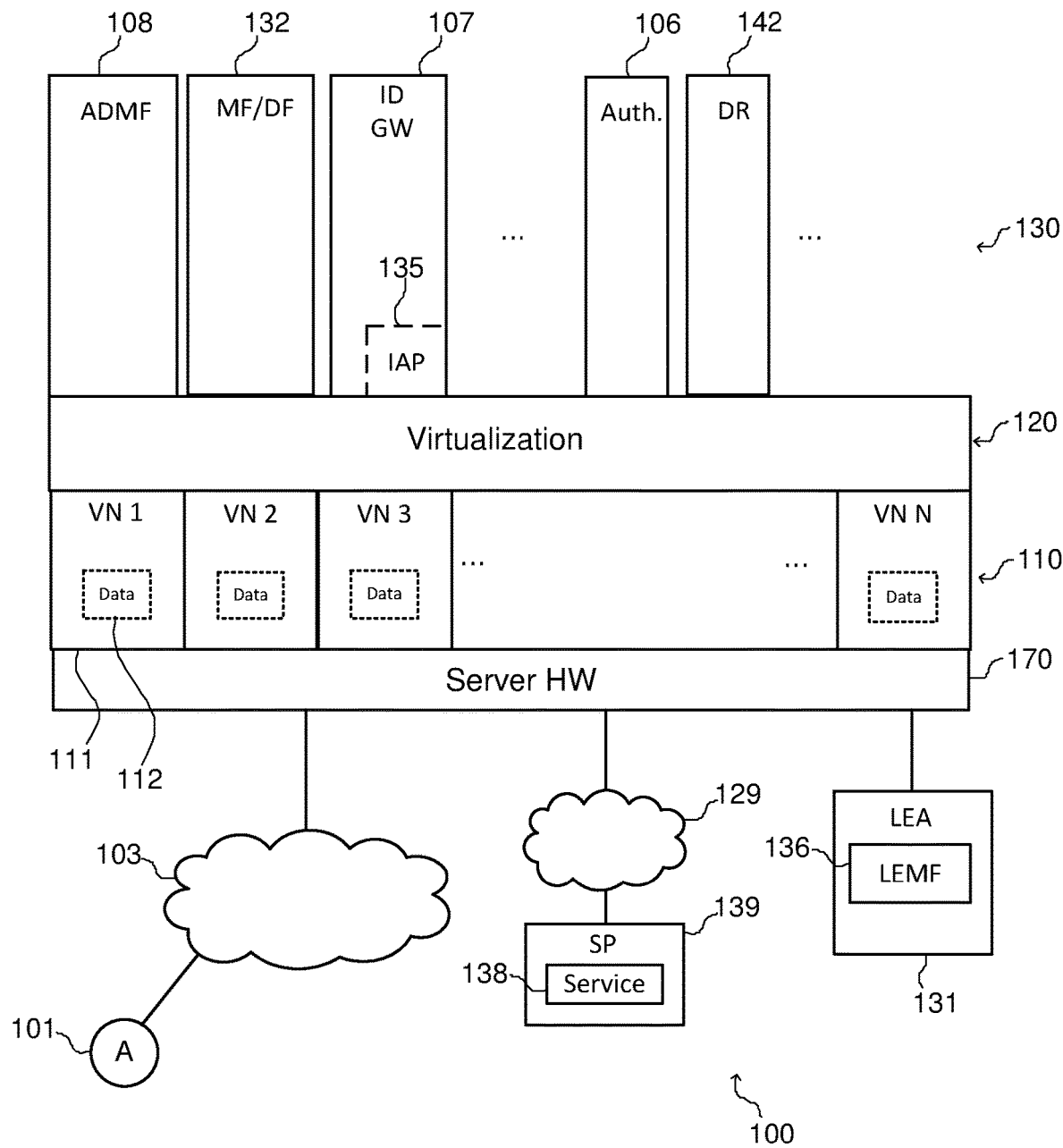

FIG. 1b schematically illustrates a second functional representation of the communication system 100. In this second functional representation, the communication system 100 is realized at least in part by virtualized functions that are executed on virtual nodes 110 that utilize a hardware server platform 170. The ADMF 108, the MF/DF 132, the ID GW 107 with the IAP 135, the authentication function 106 and the data retention server 142 are realized in a functional layer 130 of virtualized network functions (VNF) that execute in the virtual nodes 110 via a virtualization layer 120. The communicating entity 101 is connected to the hardware platform 170 via the access network 103, the service provider 139 with service 138 is connected to the hardware platform 170 via the access network 129 and the LEA/LEMF 131 with its LEMF 136 is connected to the hardware platform 170, the details of which are outside the scope of the present disclosure.

The ADMF 108, the MF/DF function 132, the ID GW 107, the IAP 135, the authentication function 106 and the data retention server 142, as well as the LEMF 136 all comprise processing and storage resources that are configured to realize and handle LI in a MC context as will be exemplified in detail below. That is, subscribers in the communication system 100, such as the communicating entity 101, may be a target A of lawful interception, as requested by the LEA 131 via the LEMF 136. In such cases, the ADMF 108, having received the request for LI from the LEMF 136, sends an interception order for the requested target A to the IAP 135 in the ID GW 107, indicating the start and stop time of the lawful interception period. During that period, as soon as the target A requires the service 138 for which an authentication process is started by the ID GW 107, then personal data for the target A that is available to the ID GW 107 is sent back to the MF/DF 132, by-passing, of course, any user consent policy. The personal data is then sent by the MF/DF 132 to the LEA 131 through the LEMF 136 over the HI2 interface.

One of the functionalities available within the mobile connect context is that, once the target A MSISDN is authorized to enter the service provider domain (i.e. use the service 138), the target's A own MSISDN is not shared with the service provider, but instead a specific PCR is used which enables the service provider 139 to identify the target A.

More specifically, the mobile connect functionality (e.g. by means of functionality in the ID GW 107) keeps PCR per end-user (i.e. per communicating entity 101 or per target A)

and per service provider to identify the user, which means that for a given user the mobile connect functionality has several PCRs whose plurality of user identities are recognizable by the service providers. The following table illustrates an example of such PCR per end-user and per service provider:

| MSISDN | Service provider | PCR |
| --- | --- | --- |
| +39555010203 | BET-and-WIN | Diabolik-70 |
| +39555010203 | BankOfDuckBurg | DonalD-21 |
| +39555010203 | CappuccinoHouse | espresso24 |
| +39555010203 | LetsChat | Willy-11 |

By providing the LEA 131 with PCRs of a target A enables the LEA 131 to identify the target A's activities within a given service provider domain (e.g. by checking the access/activity logs) where the main identity is the PCR and the MSISDN is not known or available to the LEA 131.

To summarize, in cases where the MSISDN/IMSI is the target type: when the MSISDN/IMSI under monitoring invokes a service, which requires mobile connect authentication, then the relevant personal data, e.g. PCR, plus other information shared with the service provider, are collected within an IRI and sent to the MF-DF over the X2 interface.

Conversely, in cases where the PCR is the target type and the MSISDN of a target is not known, for instance when an LEA investigation is started within the SP domain where the MSISDN is not available. In such cases the relevant personal data to be provided within the IRI may comprise the MSISDN of the communicating entity together with other data shared with the service provider.

Figure 2:
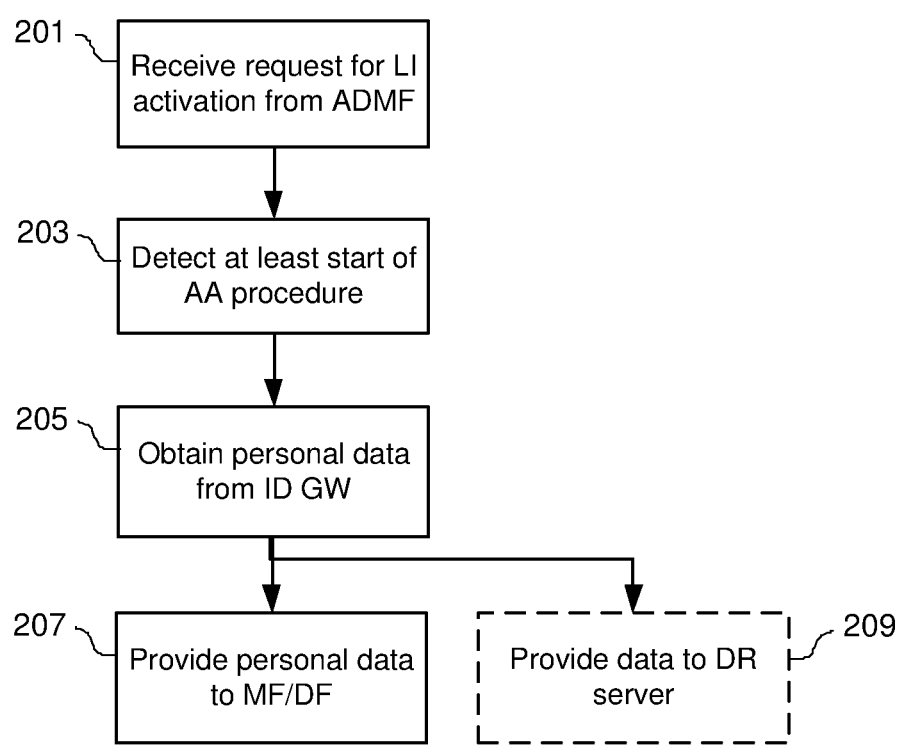
FIG. 2 is a flowchart of a method.

Turning now to FIG. 2, and with continued reference to FIGS. 1a and 1b, embodiments of methods related to LI in a MC context will be described in detail. The embodiments comprise a number of actions performed by the IAP 135 in the ID GW 107 introduced and described above in connection with FIG. 1a and FIG. 1b:

Action 201

A request for activation of LI for a target identity A during a specified LI time interval is received from the ADMF 108.

Action 203

Detection is made, during the LI time interval, that the ID GW 107 has at least started an AA procedure for the service 138 that the target identity A has requested.

For example, in some embodiments, the detecting in action 203 may comprise detecting that the ID GW function 107 has determined that the target identity A is authorized in relation to the service 138.

Action 205

As a consequence of the detection in action 205, personal data pertaining to the target identity A is obtained from the ID GW 107.

For example, in various embodiments, the personal data pertaining to the target identity A may comprise any of a timestamp that specifies a point in time when a PCR was created, a PCR associated with a second service different than the service 138, a date of birth, an address such an e-mail address, nicknames etc.

Action 207

The obtained personal data pertaining to the target identity A is then provided to the MF/DF 132.

For example, in various embodiments, the personal data may be provided to the MF/DF 132 via an X2 interface.

In some embodiments, the target identity A may be any of an MSISDN, an IMEI and a SIP-URI. In such embodiments, the personal data pertaining to the target identity A that is obtained in action 205 and provided in action 207 may comprise a PCR pertaining to the target identity's association with the requested service 138.

In other embodiments, the reception in action 201 from the ADMF 108 of the request for activation of LI comprises reception of an identifier of the requested service 138. In such embodiments, the target identity A comprises a PCR pertaining to the target identity's A association with the requested service 138, and the personal data pertaining to the target identity A comprises any of an MSISDN, an IMEI and a SIP-URI.

In addition to the actions as described above, in various embodiments, the obtained personal data pertaining to the target identity A may also be provided to the data retention server 142, as illustrated in FIG. 2 by action 209. The personal data in the data retention server may subsequently be made available to the LEA 131 via the standardized HIA and HIB interfaces. It is to be noted that the information to be sent to the data retention server is not limited to the communicating entities that are LI targets. In fact, information may be sent to the data retention server regarding all communicating entities that operate in the context of MC.

Figure 3:
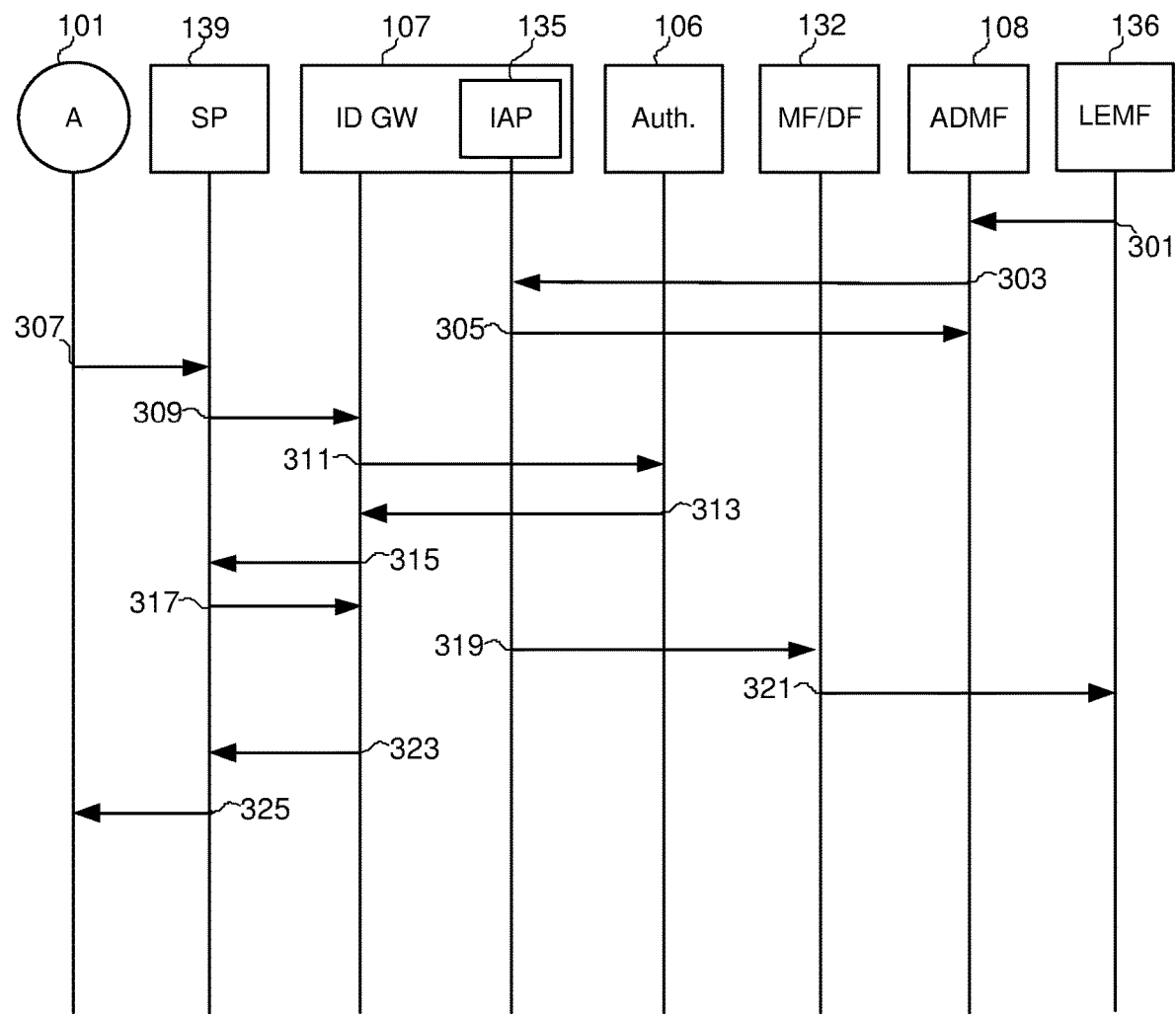
FIG. 3 is a signaling diagram, FIG. 4 schematically illustrates a computer system, and FIG. 5 schematically illustrates a computer system.

Turning now to FIG. 3, and with continued reference to FIGS. 1a, 1b and FIG. 2, a LI scenario is illustrated wherein the embodiments of the method described above are included.

The LI scenario commences by a transmission 301 from the LEMF 136 to the ADMF 108. The transmission 301 comprises a warrant for LI of a specified target, here target A that is associated with the communicating entity 101. As discussed above the specification of the target A may be an MSISDN, an IMEI, a PCR etc.

The ADMF 108 then communicates with the IAP 135 in the ID GW 107 by generating a transmission 303 comprising a target activation request and subsequently receiving from the IAP 135 a target activation response transmission 305 that comprises a confirmation that LI is activated for the specified target.

As described above, the target activation request in the transmission 303 may comprise a specification of a time interval during which the LI is to be active.

A user associated with the target A (as indicated in FIG. 3 by communicating entity 101) generates a request transmission 307 to the service provider 139 for utilizing a service that is provided or hosted by the service provider 139.

Due to the fact that the context in question is an MC context, the service provider 139 then generates a transmission 309 to the ID GW 107, where the transmission 309 comprises a request for authorizing the target A in relation to the service provider 139.

At this point in time the IAP 135 may detect, as described above, that the ID GW 107 has started an AA procedure for the service 138 that the target identity A has requested. In other words, at this point in time it can be seen as the IAP 135 has been triggered to obtain personal data pertaining to the target A, as described above.

Having received the request for authorization from the service provider 139, the ID GW 107 generates a request transmission 311 to the authentication function 106 comprising a request for authenticating the target A.

The authentication function 106 determines that the target A is authenticated and generates a response transmission 313 to the ID GW 107, the response transmission 313 comprising information to the effect that the target A is authenticated.

Similar to, or alternative to, the point in time between transmissions 309 and 311, at this point in time the IAP 135 may detect, as described above, that the ID GW 107 has started an AA procedure for the service 138 that the target identity A has requested. In other words, at this point in time it can be seen as the IAP 135 has been triggered to obtain personal data pertaining to the target A, as described above.

It is to be noted that the triggering, in the IAP 135, of the obtaining of personal data may occur concurrently with any of the transmissions 309-313 above or 315-317 that follow.

Having noted that the target A is authenticated, the ID GW 107 generates a transmission 315 to the service provider 139, the transmission 315 comprising an authorization response to the corresponding request transmission 309 received earlier. Since the target A was authenticated, the transmission 315 comprises information to the effect that the target A is authorized in relation to the service provider 139.

The service provider 139, having recognized that the target A is authorized from the received transmission 315, then generates a request transmission 317 to the ID GW 107 comprising a request for a token. The reason why the service provider 139 requires the token is because, at the time of reception of the transmission 315, it is not yet able to identify the user who requests the service 138. With the received transmission 315 the service provider 139 knows that the user associated with the target A is authenticated but it does not know who the user is in terms of a PCR.

The ID GW 107 then retrieves an already existing PCR that associates the target A with the service provider 139 or the ID GW 139 generates a new PCR that associates the target A with the service provider 139.

Having being triggered as described above the IAP 135 then obtains, from the ID GW 107, personal data pertaining to the target A and generates a transmission 319 to the MF/DF 132 that comprises the obtained personal data. The transmission 319 may take place over the X2 interface.

The MF/DF 132 in turn then generates a report and generates a transmission 321 to the LEMF 136 that comprises the personal data pertaining to the target A. The transmission 321 may take place over the HI2 interface and the personal data may be packaged into a suitably modified "PartyInformation" data structure as defined in 3GPP 33.108 Release 15.

Having generated an identity token, comprising the obtained PCR or generated new PCR, together with an access token specific for the user associated with the target A, the ID GW 107 generates a transmission 323 to the service provider 139, the transmission 323 comprising the generated identity and access tokens.

As a consequence of receiving the tokens in transmission 323, the service provider 139 extracts the PCR from the identity token. Since the PCR is unique for the user associated with the target A at the service provider 139 it is used by the service provider 139 to link the user associated with the target A to the PCR in the MC context, i.e. the user associated with target A is now identified (in terms of the PCR) at the service provider 139.

The service provider 139 then generates a response transmission 325 to the user associated with the target A, the response transmission 325 comprising a confirmation that the user may utilize the requested service 138.

Figure 4:
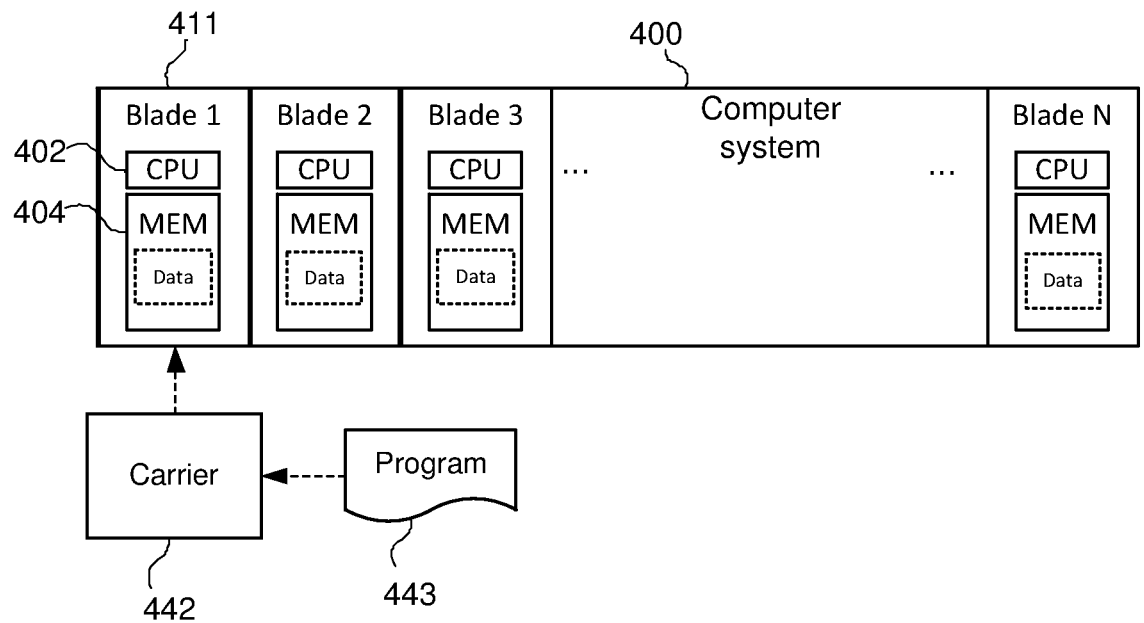

Turning now to FIG. 4, and with continued reference to FIGS. 1 to 3, a computer system 400 will be described in some more detail. The computer system 400, which may correspond to at least part of the communication system 100, comprises a plurality of server blades 411 that comprise a processor 402 and a memory 404. The memory 404 contains instructions executable by the processor 402 whereby the computer system 400 is operative to:

receive, from a LI ADMF 108, a request for activation of LI for a target identity A during a specified LI time interval, detect, during the LI time interval, that an ID GW function 107 has at least started an AA procedure for a service 138 that the target identity A has requested and as a consequence of said detection perform:

obtain, from the ID GW function 107, personal data pertaining to the target identity A, and provide, to a LI MF/DF 132, the obtained personal data pertaining to the target identity A.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the computer system 400 is operative such that the detecting comprises detecting that the ID GW function 107 has determined that the target identity A is authorized in relation to the service 138.

In some embodiments, the computer system 400 is operative such that the target identity A is any of an MSISDN, an IMEI and a SIP-URI, and the personal data pertaining to the target identity A comprises a PCR pertaining to the target identity's association with the requested service 138.

In some embodiments, the computer system 400 is operative such that: the reception, from the ADMF 108, of the request for activation of LI comprises reception of an identifier of the requested service 138, the target identity A comprises a PCR pertaining to the target identity's A association with the requested service 138, and the personal data pertaining to the target identity A comprises any of an MSISDN, an IMEI and a SIP-URI.

In some embodiments, the computer system 400 is operative such that the personal data pertaining to the target identity A comprises any of: a timestamp that specifies a point in time when a PCR was created, a PCR associated with a second service different than the service 138, a date of birth and an address.

In some embodiments, the computer system 400 is operative such that the personal data is provided to the LI MF/DF 132 via an X2 interface.

In some embodiments, the computer system 400 is operative to provide, to a data retention server 142, the obtained personal data pertaining to the target identity A.

Figure 5:
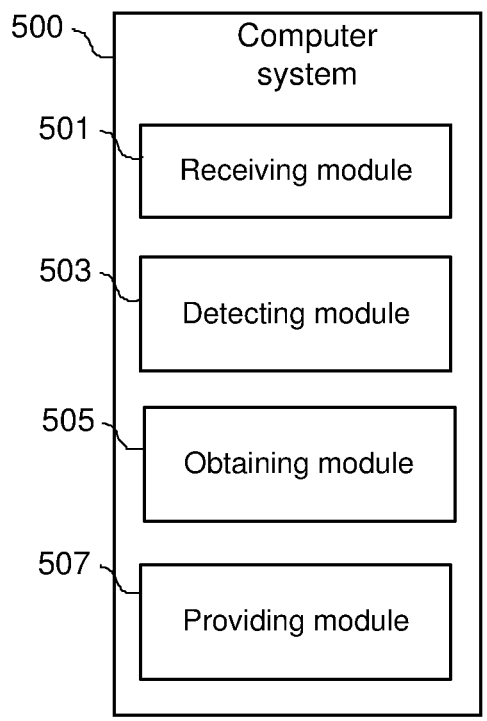

Turning now to FIG. 5, and with continued reference to FIGS. 1 to 4, a computer system 500 will be described in some more detail. The computer system 500 comprises:

a receiving module 501 configured to receive, from a LI ADMF 108, a request for activation of LI for a target identity A during a specified LI time interval, a detecting module 503 configured to detect, during the LI time interval, that an ID GW function 107 has at least started an AA procedure for a service 138 that the target identity A has requested and as a consequence of said detection perform:

an obtaining module 505 configured to obtain, from the ID GW function 107, personal data pertaining to the target identity A, and a providing module 507 configured to provide, to a LI MF/DF 132, the obtained personal data pertaining to the target identity A.

The computer system 500 may comprise further modules that are configured to perform in a similar manner as, e.g., the computer system 400 described above in connection with FIG. 4.

The invention claimed is:

1. A method performed by a lawful interception (LI) intercept access point (IAP) function in a mobile connect (MC) identity gateway (ID GW) function, the method comprising:
   receiving, from a LI administrative function (ADMF) a request for activation of LI for a target identity during a specified LI time interval;
   detecting, during the specified LI time interval, that the ID GW function has at least started an authentication and authorization (AA) procedure for a service that the target identity has requested; and
   as a consequence of detecting that the ID GW function has at least started the AA procedure:
   obtaining, from the ID GW function, personal data pertaining to the target identity; and
   providing to an LI mediation and delivery function (MF/DF) the obtained personal data pertaining to the target identity.

2. The method of claim 1, wherein the step of detecting comprises detecting that the ID GW function has determined that the target identity is authorized in relation to the service.

3. The method of claim 1, wherein
   the target identity is any of a mobile station international subscriber directory number (MSISDN), an international mobile equipment identity (IMEI) and a session initiation protocol uniform resource identifier (SIP-URI), and
   the personal data pertaining to the target identity comprises a pseudonymous customer reference (PCR) pertaining to the target identity's association with the requested service.

4. The method of claim 1, wherein:
   the reception, from the ADMF, of the request for activation of LI comprises reception of an identifier of the requested service,
   the target identity comprises a pseudonymous customer reference (PCR) pertaining to the target identity's association with the requested service, and
   the personal data pertaining to the target identity comprises any of a mobile station international subscriber directory number (MSISDN), an international mobile equipment identity (IMEI), a session initiation protocol uniform resource identifier (SIP-URI).

5. The method of claim 1, wherein the personal data pertaining to the target identity comprises any of:
   a timestamp that specifies a point in time when a PCR was created,
   a PCR associated with a second service different than the service,
   a date of birth, and
   an address.

6. The method of claim 1, wherein the personal data is provided to the LI MF/DF via an X2 interface.

7. The method of claim 1, further comprising:
   providing, to a data retention server, the obtained personal data pertaining to the target identity.

8. A computer system comprising a plurality of server blades, each server blade comprising a processor and a memory, said memory containing instructions executable by said processor whereby said computer system is operative to perform the method of claim 1.

9. A non-transitory computer readable medium storing a computer program comprising instructions which, when executed on at least one processor in a server blade in a computer system, cause the computer system to carry out the method of claim 1.

* * * * *